United States Patent
Segev et al.

(10) Patent No.: US 12,425,146 B2
(45) Date of Patent: Sep. 23, 2025

(54) UL MU OFDMA TRIGGER BASED PEER-TO-PEER OPERATION WITH UL MU MIMO

(71) Applicant: Intel Corporation, Santa Clara, CA (US)

(72) Inventors: Yonathan Segev, Sunnyvale, CA (US); Qinghua Li, San Ramon, CA (US); Xiaogang Chen, Portland, OR (US); Ofer Hareuveni, Haifa (IL); David Birnbaum, Modiin (IL)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 17/557,257

(22) Filed: Dec. 21, 2021

(65) Prior Publication Data

US 2022/0116165 A1    Apr. 14, 2022

(51) Int. Cl.
| | |
|---|---|
| *H04L 5/00* | (2006.01) |
| *H04B 7/06* | (2006.01) |
| *H04W 72/12* | (2023.01) |
| *H04W 72/1263* | (2023.01) |
| *H04B 7/0452* | (2017.01) |

(Continued)

(52) U.S. Cl.
CPC ......... *H04L 5/0035* (2013.01); *H04B 7/0626* (2013.01); *H04W 72/1263* (2013.01); *H04B 7/0452* (2013.01); *H04L 5/0007* (2013.01); *H04W 84/12* (2013.01); *H04W 92/20* (2013.01)

(58) Field of Classification Search
CPC ... H04L 5/0035; H04L 5/0007; H04B 7/0626; H04B 7/0452; H04W 72/1263; H04W 84/12; H04W 92/20
See application file for complete search history.

(56) References Cited

U.S. PATENT DOCUMENTS

| | | | |
|---|---|---|---|
| 2020/0305231 A1* | 9/2020 | Sadeghi | H04W 12/30 |
| 2023/0247666 A1* | 8/2023 | Kim | H04W 74/0808 |

(Continued)

FOREIGN PATENT DOCUMENTS

CN         116366665 A      6/2023

*Primary Examiner* — Derrick V Rose
(74) *Attorney, Agent, or Firm* — Schwegman Lundberg & Woessner, P.A.

(57) ABSTRACT

An access point (AP) is configured for trigger-based peer-to-peer (TB P2P) operation with at least two peer stations (P2P1) and (P2P2) in which the AP (API) is operating as a coordinator. The AP may be configured to encode a trigger frame (AP TF) for transmission to reserve channel resources for two or more P2P transfers and identify times for each of the P2P transfers and may indicate an allocation of channel resources to a first of the peer stations (P2P1) for a first of the P2P transfers and to a second of the peer stations (P2P2) for a second of the P2P transfers. During the allocation for the first P2P transfer, the AP may decode a null data packet (NDP) frame for channel sounding received from the first peer station (P2P1). The AP may also encode a TB physical layer protocol data unit (PPDU) in accordance with a multi-user orthogonal frequency division multiple access (MU OFDMA) frame format a transmission to the first peer station (P2P1) in accordance with an uplink multi-user multiple-input multiple output (UL MU MIMO) technique.

15 Claims, 9 Drawing Sheets

(51) Int. Cl.
*H04W 84/12* (2009.01)
*H04W 92/20* (2009.01)

(56) References Cited

U.S. PATENT DOCUMENTS

2024/0015055 A1* 1/2024 Thoumy ............... H04W 76/15
2024/0275566 A1* 8/2024 Lin ....................... H04L 5/0053

* cited by examiner

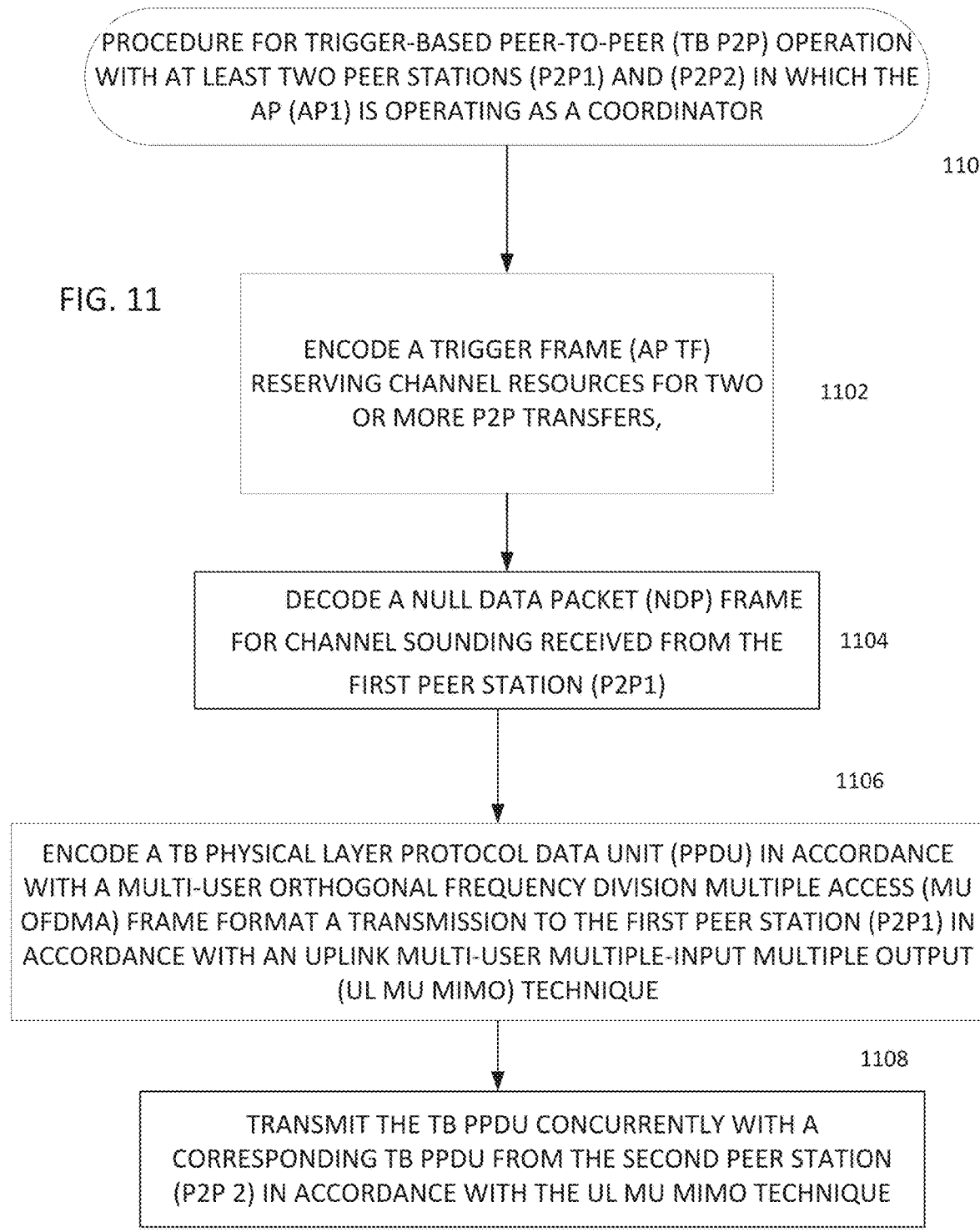

UL MU OFDMA TRIGGER BASED PEER-TO-PEER OPERATION WITH UL MU MIMO

TECHNICAL FIELD

Embodiments pertain to wireless communications. Some embodiments pertain to wireless networks including wireless local area networks (WLANs) and Wi-Fi networks including networks operating in accordance with the IEEE 802.11 family of standards. Some embodiments relate to extremely high throughput (EHT) communications. Some embodiments relate to peer-to-peer (P2P) operations.

BACKGROUND

One In 2019 the FCC enabled use of certain channels in the 6 GHz band, this resulted in the Wi-Fi 6e program which requires fixed indoor Access Point (AP) operation in Low Power (LP) and under the use of channel master which continuously communicate with a network entity to verify co-existence with incumbents use of the channels. This Low Power indoor operation is limited to AP to client station (STA) operation i.e. not useable for Peer to Peer (P2P) devices.

Furthermore, 802.11 be introduced a Trigger Based (TB) Peer to Peer (P2P) operation where the AP allocates a transmission opportunity (TxOP) to the peers for data communication. However the scheme does not support UL OFDMA operation and does not support UL Multi-User MIMO (UL MU MIMO).

Tunneled Direct Link Setup (TDLS) is another technology which plays a part in the field with devices such as Google Chromecast employing TDLS to setup link between two client stations (STA). TDLS is limited to Single User operation and once the link is setup, the link itself is unmanaged thus uncontrolled by the AP resulting in QoS conflicts between one or more P2P links or between a P2P link and QoS of the AP scheduler.

Thus, what is needed are improved techniques for P2P operations.

BRIEF DESCRIPTION OF THE DRAWINGS

FIG. 11 illustrates a procedure for advanced TB P2P operation in accordance with some embodiments.

DETAILED DESCRIPTION

Figure 1:
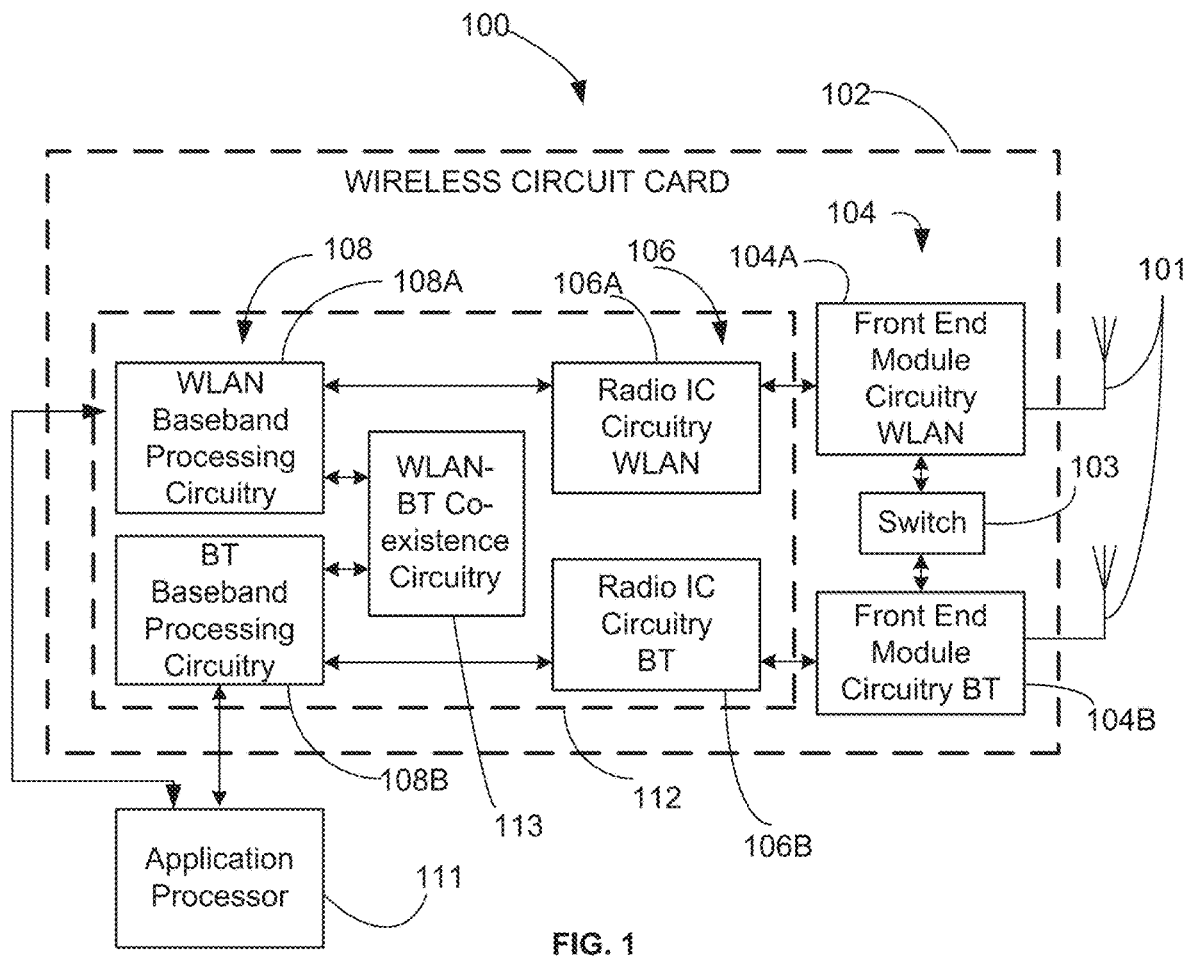
FIG. 1 is a block diagram of a radio architecture in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein are directed to advanced UL MU OFDMA Trigger Based Peer to Peer operations. These embodiments are described in more detail below.

Some embodiments are directed to an access point (AP) configured for trigger-based peer-to-peer (TB P2P) operation with at least two peer stations (P2P1) and (P2P2) in which the AP (AP1) is operating as a coordinator. In these embodiments, the AP may be configured to encode a trigger frame (AP TO for transmission. The AP TF may reserve channel resources for two or more P2P transfers and identify times (e.g., start and end times) for each of the P2P transfers and may indicate an allocation of channel resources to a first of the peer stations (P2P1) for a first of the P2P transfers and to a second of the peer stations (P2P2) for a second of the P2P transfers. In these embodiments, during the allocation for the first P2P transfer, the AP may decode a null data packet (NDP) frame for channel sounding received from the first peer station (P2P1). The AP may also encode a TB physical layer protocol data unit (PPDU) in accordance with a multi-user orthogonal frequency division multiple access (MU OFDMA) frame format a transmission to the first peer station (P2P1) in accordance with an uplink multi-user multiple-input multiple output (UL MU MIMO) technique. In these embodiments, the transmission may be based on channel state information determined from the NDP frame. In these embodiments, the TB may be transmitted concurrently with a corresponding TB PPDU from the second peer station (P2P2) in accordance with the UL MU MIMO technique based on a channel state information determined by the second peer station (P2P2) from the NDP frame. These embodiments are described in more detail below.

In these embodiments, illustrated in FIG. 8 (discussed in more detail below) two or more peer stations (i.e., P2P2, AP1 and AP2) may transmit a TB PPDU concurrently to the first peer station (P2P1) during the allocation for the first P2P transfer. In these embodiments, the AP may be configured to send the AP TF based upon an indication that it has data available in its transmit buffer to send to the P2P1 and/or an indication that the P2P2 has data available in its transmit buffer to send to the P2P1.

In some embodiments, during the allocation for the second P2P transfer, the AP may decode a second NDP frame for channel sounding received from the second peer station (P2P2). The AP may also encode a second TB PPDU in accordance with the MU OFDMA frame format for a second transmission to the second peer station (P2P2) in accordance with the UL MU MIMO technique. The second transmission may be based on channel state information determined from the second. NDP frame. In these embodiments, the second TB PPDU may be transmitted concurrently with a corresponding second TB PPDU transmission from the first peer station (P2P1) in accordance with the UL MU MIMO technique based on a channel state information determined by the first peer station (P2P2) from the second NDP frame. In these embodiments, illustrated in FIG. 8, two or more peer stations (i.e., P2P1, AP1 and AP2) may transmit a TB PPDU concurrently to the second peer station (P2P2) during the allocation for the second P2P transfer.

In some embodiments, during the allocation for the first P2P transfer after transmission of the TB PPDU, the AP may decode scheduling feedback from the first peer station (P2P1). The scheduling feedback may indicate whether or not the first peer station has additional data to send. In these embodiments, during the allocation for the second P2P transfer after transmission of the second TB PPDU, the AP may decode scheduling feedback from the second peer station (P2P12, the scheduling feedback indicating whether or not the second peer station has additional data to send. In some embodiments, scheduling feedback may indicate a status of a transmit source buffer of the sending station.

In some embodiments, the AP may encode the trigger frame (AP TF) to reserve channel resources for a third P2P transfer indicating an allocation of channel resources to one of the peer stations e.g., the P2P1, the P2P2 or the AP2 for the third P2P transfer. The allocation of channel resources for the third P2P transfer may occur after the second P2P transfer.

In some embodiments, the trigger frame may be encoded to indicate start and end times of each of the P2P transfers. In these embodiments, a per user information field of the trigger frame may be encoded to indicate the allocation of channel resources to the first peer station (P2P1) for the first P2P transfer and to indicate the allocation of channel resources to the second peer station (P2P1) for the second P2P transfer. In these embodiments, the per user information field of the trigger frame may be used to make individual source to destination medium allocations, although the scope of the embodiments are not limited in this respect.

In some embodiments, for transmission of the TB PPDU in accordance with the MU OFDMA frame format, the AP may determine a transmit power level, a time alignment, a frequency alignment and beamforming for transmission to the first peer station (P2P1) in accordance with a UL MU MIMO technique based on the NDP for channel sounding. These embodiments are described in more detail below.

In some embodiments, the NDP received from the first peer station (P2P1) comprises a secondary trigger frame appended with an NDP extension (NE). The secondary trigger frame may allocate resources by the P2P1 to the AP1 and the P2P2 for concurrent transmission of the TB PPDUs in accordance with the UL MU MIMO technique during the first P2P allocation. In these embodiments, the second NDP received from the second peer station (P2P2) may comprise a second secondary trigger frame appended with an NDP extension (NE). The second secondary trigger frame may allocate resources by the P2P2 to the AP1 and the P2P1 for concurrent transmission of the second TB PPDUs in accordance with the UL MU MIMO technique during the second P2P allocation. In some embodiments, the NE of the secondary trigger frames may comprise additional symbols for channel sounding in a P-matrix format. These embodiments are described in more detail below.

In some embodiments, the AP may be an extremely high throughput (EHT) AP configured for operating in accordance with an IEEE 802.11 be standard. In these embodiments, the TB PPDU encoded in accordance with the MU OFDMA frame format may be an HE TB PPDU. In these embodiments, the TB PPDU may be transmitted concurrently with a corresponding HE TB PPDU from the second peer station (P2P2) in accordance with the UL MU MIMO technique. These embodiments are described in more detail below.

In some embodiments, the AP may be a high efficiency (HP) AP configured for operating in accordance with an IEEE 802.11ax standard. In these embodiments, the TB PPDU may be encoded in accordance with the MU OFDMA frame format may be an HE TB PPDU. In these embodiments, the TB PPDU may be transmitted concurrently with a corresponding HE TB PPDU from the second peer station (P2P2) in accordance with the UL MU MIMO technique. These embodiments are described in more detail below.

Some embodiments are directed to a non-access point station (STA). In these embodiments, when operating a first peer station (P2P1) for trigger-based peer-to-peer (TB P2P) operation with at least two other stations including a second peer station (P2P2) and an access point (AP) (AP1) in which the AP (AP1) is operating as a coordinator, the STA may be configured to decode a trigger frame (AP TF) from the AP. The AP TF may reserve channel resources for two or more P2P transfers. The AP TF may identify times for each of the P2P transfers and may indicate an allocation of channel resources to the first peer station (P2P1) for a first of the P2P transfers and to the second peer station (P2P2) for a second of the P2P transfers. In these embodiments, during the allocation for the first P2P transfer, the STA may encode a null data packet (NDP) frame for channel sounding for transmission. The STA may also decode a TB physical layer protocol data unit (PPDU) in accordance with a multi-user orthogonal frequency division multiple access (MU OFDMA) frame format from the AP (AP1) in accordance with an uplink multi-user multiple-input multiple output (UL MU MIMO) technique. The transmission may be based on channel state information determined by the AP (AP1) from the NDP frame. In these embodiments, the TB PPDU may be received concurrently with a corresponding TB PPDU from the second peer station (P2P2) that may be transmitted in accordance with the UL. MU MIMO technique based on channel state information determined by the second peer station (P2P2) from the NDP frame. These embodiments are described in more detail below.

Some embodiments are directed to a non-transitory computer-readable storage medium that stores instructions for execution by processing circuitry of an access point (AP). In these embodiments, the processing circuitry may configure the AP for trigger-based peer-to-peer (TB P2P) operation with at least two peer stations (P2P1) and (P2P) in which the AP (AP1) is operating as a coordinator. These embodiments are described in more detail below.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN FEM circuitry 104A and a Bluetooth (BT) FEM circuitry 104B. The WLAN FEM circuitry 104A may include a receive signal path comprising circuitry configured to operate on WLAN RE signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM. 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B, WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102, In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In some embodiments, the radio architecture 100 may be configured for Extremely High Throughput (EHT) communications in accordance with the IEEE 802.11be standard. In these embodiments, the radio architecture 100 may be configured to communicate in accordance with an OFDMA technique, although the scope of the embodiments is not limited in this respect. In some embodiments, the radio architecture 100 may be configured for next generation vehicle-to-everything (NGV) communications in accordance with the IEEE 802.11bd standard and one or more stations including the AP 502 may be next generation vehicle-to-everything (NGV) stations (STAs).

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards.

In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
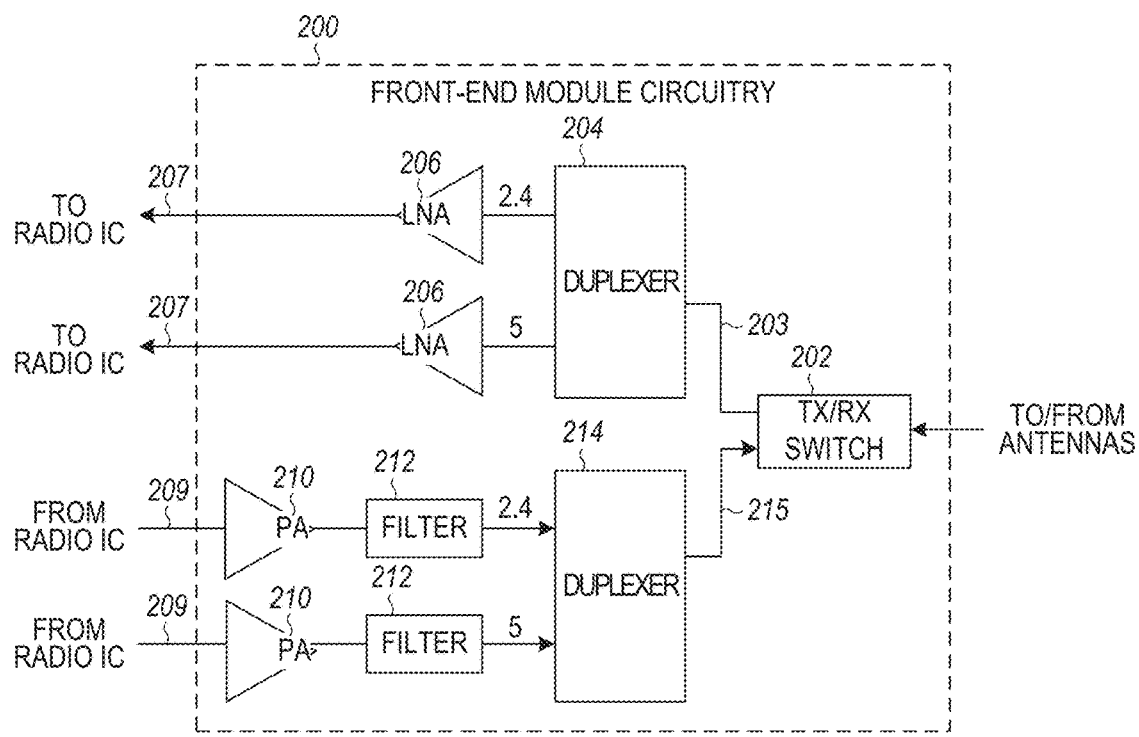
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
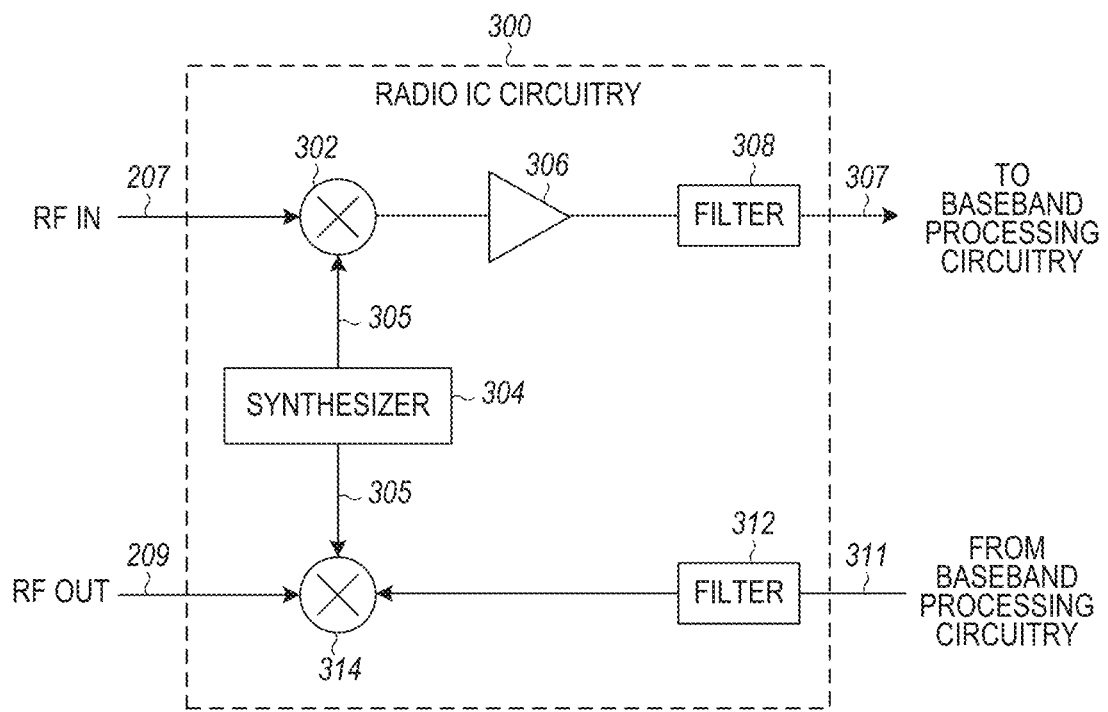
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FERN circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
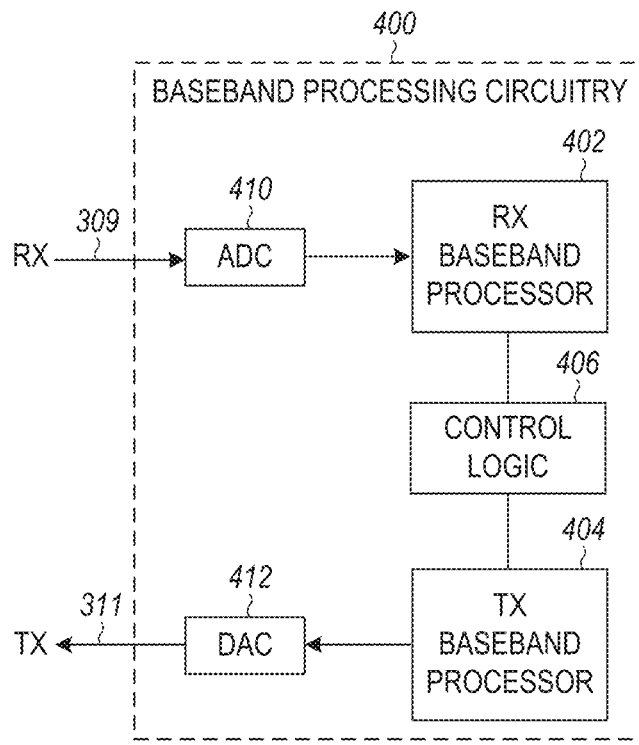
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106, The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
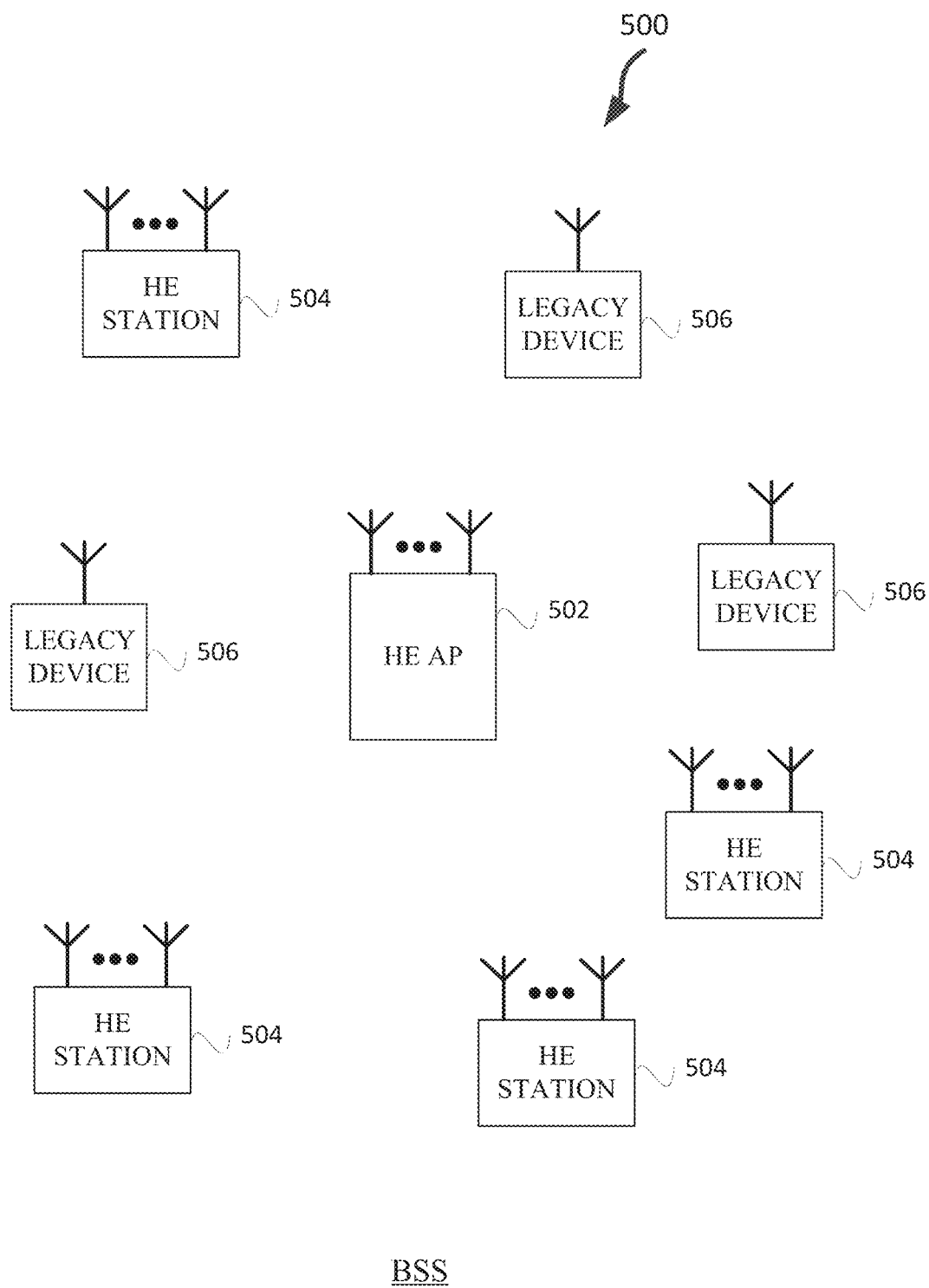
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless e.g., IEEE 802.11ax) (HE) stations 504, and a plurality of legacy e.g., IEEE 802.11n/ac) devices 506. In some embodiments, WLAN 500 may be configured for Extremely High Throughput (EHT) communications in accordance with the IEEE 802.11be standard and one or more stations including the AP 502 may be EHT STAs. In some embodiments, WLAN 500 may be configured for next generation vehicle-to-everything (NGV) communications in accordance with the IEEE 802.11bd standard and one or more stations including the AP 502 may be next generation vehicle-to-everything (NGV) stations (STAs).

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA), The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDM and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95) Interim Standard 856 (IS-856), Long Term Evolution (LIE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), Bluetooth®, or other technologies.

Some embodiments relate to HE communications. In accordance with some IEEE 802.11 embodiments (e.g., IEEE 802.11ax embodiments) a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, RE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the RE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO anchor UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein.

In example embodiments, the HE station 504 and/or the HE AP 502 are configured to perform the methods and operations/functions described herein. In example embodiments, an apparatus of the HE station 504 and/or an apparatus of the HE AP 502 are configured to perform the methods and functions described herein. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
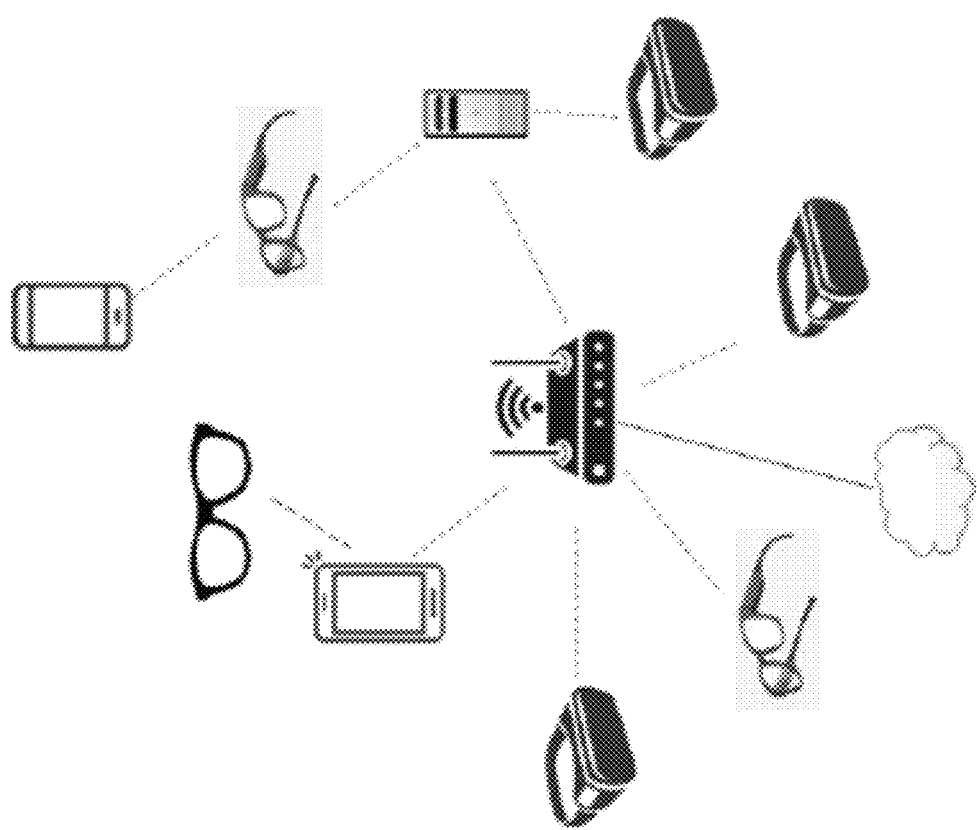
FIG. 6 illustrates a Mixed P2P and Star Configuration in an AR/VR scenario in accordance with some embodiments.

FIG. 6 illustrates a Mixed P2P and Star Configuration in an AR/VR, scenario in accordance with some embodiments. FIG. 6 shows an AP to client star topology accompanied with several P2P connections, note the different P2P connections are independent and unaware of each other's scheduling as well as the AP scheduling.

In the 6 GHz band the P2P stations (STA) must operate in the same channel as the AP. The existing technique available in the market is TDLS (Tunneled Direct Link Setup) and it is an unmanaged by the AP once link is setup. In standardization IEEE 802.11be EHT has a P2P TB operation, however this operation is limited to single P2P pair with no ability to manage between more than a single pair, no UL MIMO can be achieved and limited ability of the client STAs to control the scheduling transmitted by the AP.

In the 802.11be TB P2P the AP allocates TxOP to the peers for data communication. However this scheme is limited because the STA are following AP assignment but the information that derives the scheduling resides with the P2P STAs and not with the AP. This results in a limitation to how fresh the scheduling can be because of the feedback cycle duration. Furthermore, this scheme is limited to OFDMA which has a much lower spectral efficiency because the sub symbol level timing reference is set by the AP rather than by the target STA for the information.

Figure 7:
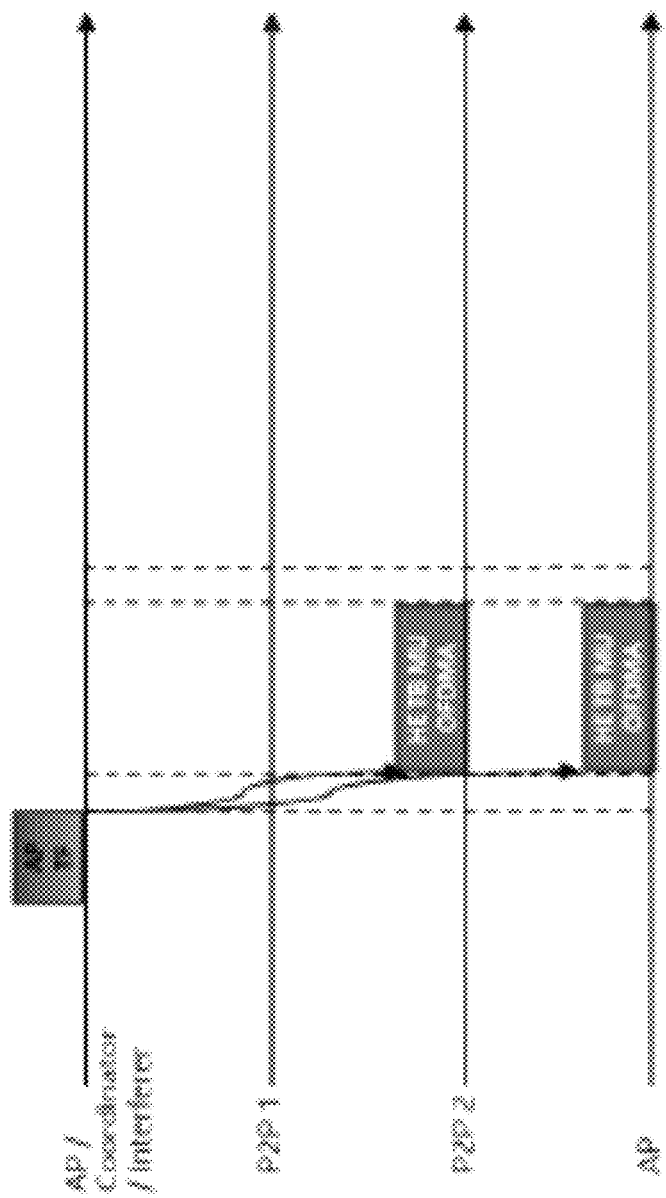
FIG. 7 illustrates a trigger based P2P operation.

FIG. 7 illustrates a trigger based P2P operation. For example in FIG. 7, AP/Coordinator is the entity responsible for transmitting the Trigger Frame (TF) P2P2 and AP are transmitting to P2P 1 but the timing reference is coming from AP/Coordinator so the beams as they arrive to P2P1 are not aligned at the sample level to allow for MU MIMO and the P-matrix usage. In addition there is no prior knowledge of the channel between P2P2 and P2P1 and between AP and P2P1 so beam forming cannot be utilized. The current market requirements is for 6 concurrent P2P pairs in a single coverage area, with as much as ×10 that within a couple of years (next generation).

Another P2P scheduling protocol is Tunneled Direct Link Setup (TDLS) as defined in 802.11z, however this is even far worse as it is limited to SU OFDM operation.

Figure 8:
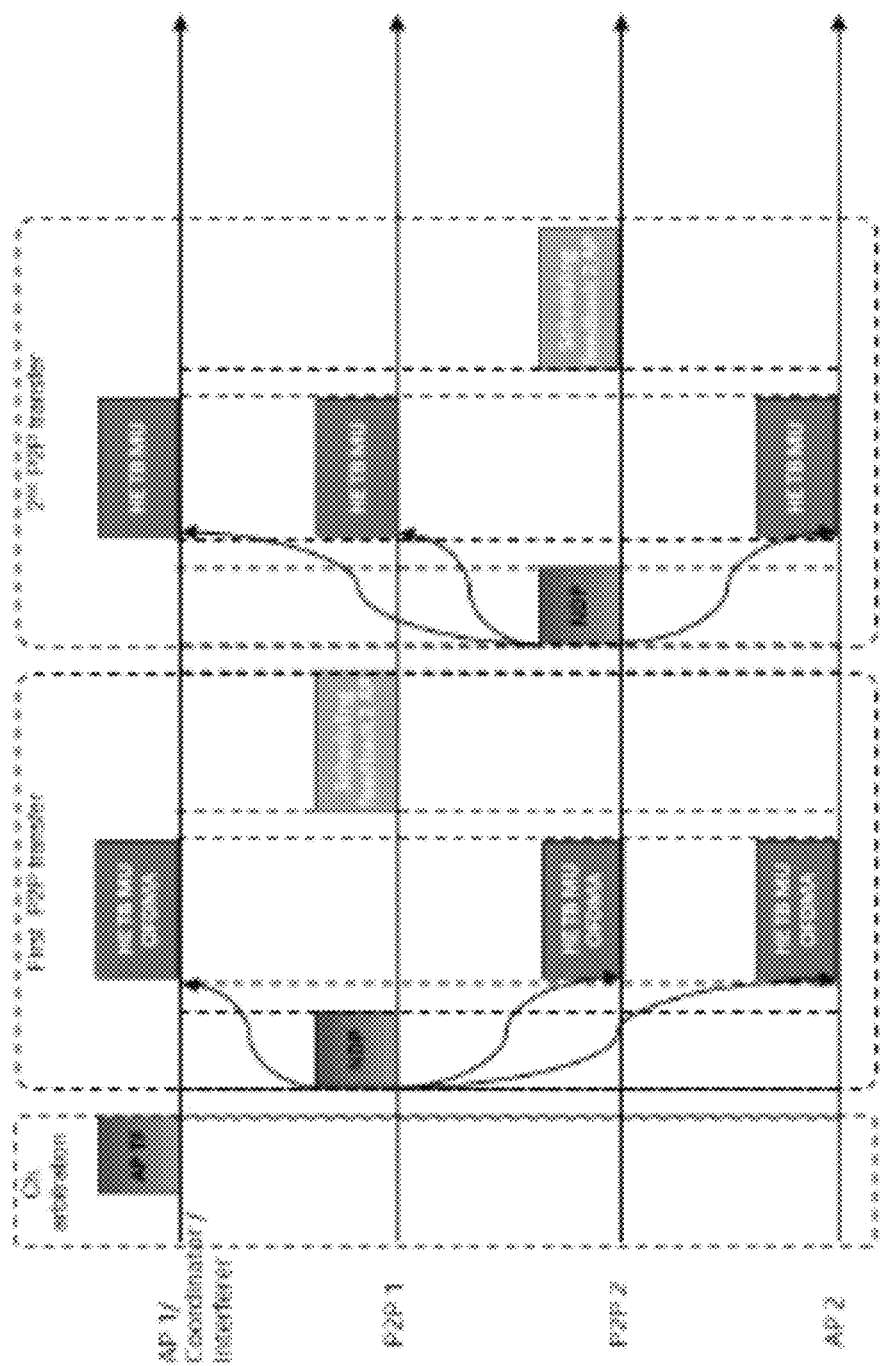
FIG. 8 illustrates an advanced TB P2P operation in accordance with embodiments.

FIG. 8 illustrates an advanced TB P2P operation in accordance with embodiments. These embodiments may enable Multi-User (MU) MIMO (Multiple In Multiple Out)

transmission scheme while maintaining the AP as the arbitrator of the TXOP reservation, by that allowing the AP to manage the medium resource while taking advantage of the spectral efficiency that UL MU MIMO provides.

These embodiments have the AP transmit the medium reservation (AP IF in FIG. 8) while the target STA follows that with a sounding frame (NDP) received by the various STAs (AP1, P2P2 and AP2), the STAs then transmit UL MU MIMO encoded frames (shown in FIG. 8 as HE TB MU OFDMA) to the sink STA (P2P1).

The embodiment demonstrated in FIG. 8 also show the possibility to have more than a single P2P transfer. The sequence divides to three parts:

Channel arbitration—in which the AP reserves the channel for the two P2P transfers and also times the start and end times of the P2P transfers and using the TF per User Info makes the allocations for individual source to destination medium allocations.

First and 2nd P2P Transfers—each of which starts with channel sounding using NDP frame which allow the source STAs to perform sounding, obtain the channel and transmit an UL MU MIMO using the proper transmit power, timing alignment, frequency alignment and beam forming required for the UL MU MIMO transmission.

At the end of each of those the Scheduling Feedback 2 AP provide information regarding the next cycle of medium resource allocations.

Advantages to these some of these embodiments include:

Allows the use of UL MU MIMO for P2P operation, by that allowing much high spectrum efficiency.

Feature a single entity medium arbitration by that Allow multi P2P links to co-exist on single channel while maintaining QoS across the links.

Allow the P2P operation in the 6 GHz band on the same or different channel than that of the AP/Channel coordinator.

A UL MU MIMO scenario is likely for next generation of AR/VR equipment where much of the rendering is happening off the Head Mounted Device (HMD) for improved power consumption for the AR/VR devices.

IEEE 802.11 provides several method for improved spectral efficiency, improved spectral efficiency as $2^{nd}$ implication on QoS and SLA, as the possibilities for scheduling that meet the QoS and SLA are much greater due to lower medium occupancy and ability for concur transmissions without collision.

However UL MU MIMO requires fine level of channel state (CS) to be obtained, while the channel coherency time (duration the channel is mostly unchanged) is just a couple of milliseconds long (~8 msec). Furthermore in the existing TB scheme the IF which times the transmission is not generated by the receiver of the transmission but by the AP managing the P2P connection.

The innovative design disclosed herein provides a new sequence which incorporates a scheduler from an AP with a sounding element from the receiving STA by that overcoming this limitation. Furthermore, this method of separating medium reservation from sounding is also possible to expand to more than a single P2P pair such that the medium overhead and power consumption associated with current generation of 802.11be TB P2P is improved as can be seen in FIG. 8.

STAs that are participating in a P2P sequence extract the information of when the sounding frame is transmitted and by which STAs and cross that with the allocation assignment and target STA from the Per User Info field, both information pieces are provided in the Trigger Frame (TF).

Figure 9:
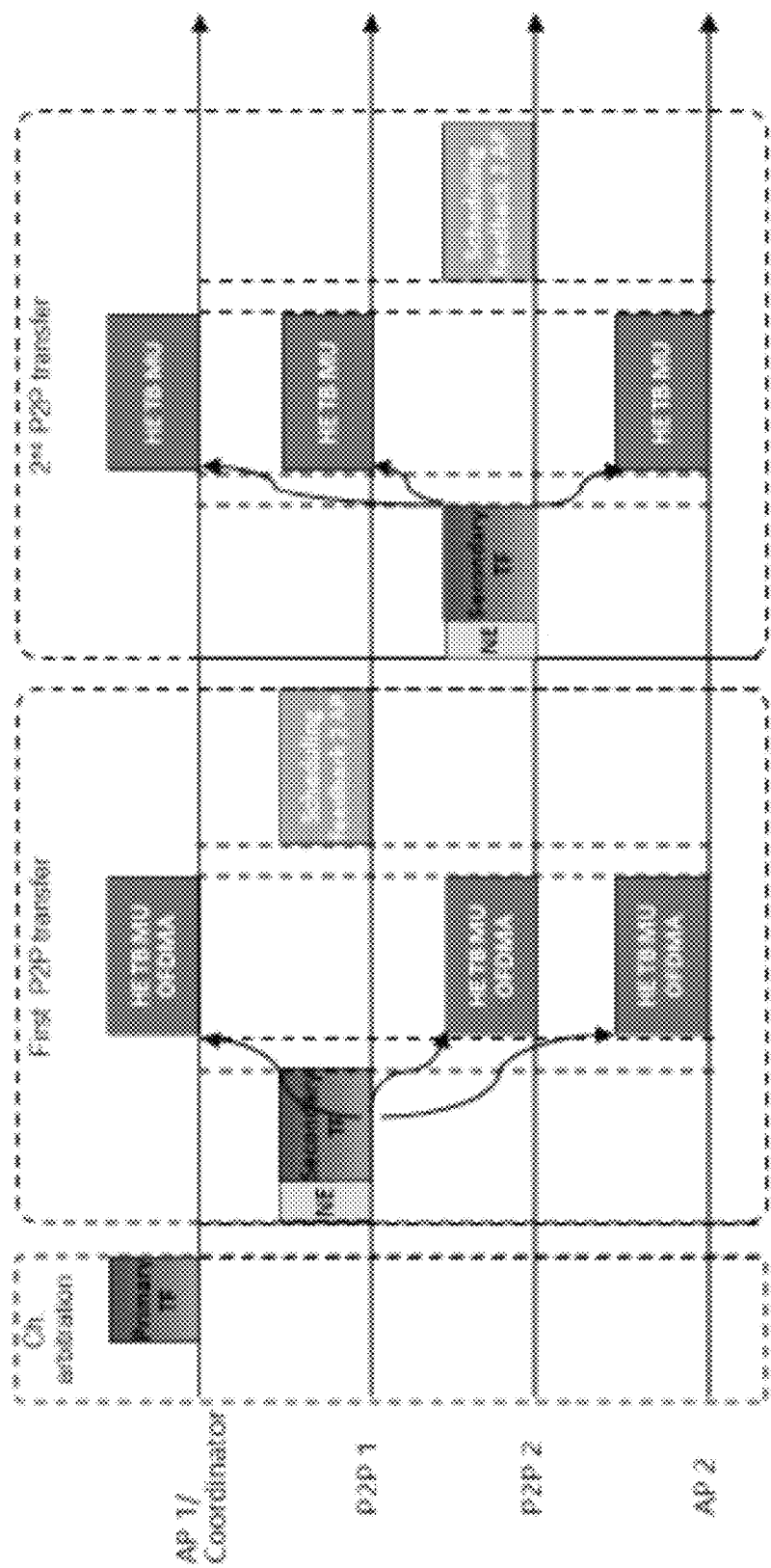
FIG. 9 illustrates an advanced multi-secondary allocation TB P2P operation in accordance with embodiments.

FIG. 9 illustrates an advanced multi-secondary allocation TB P2P operation in accordance with embodiments. A combination of Main TF, which reserves the channel and distribute per STA medium allocation and secondary TF, which is responsible for per STA triggering of UL transmissions to that STA can also be incorporated into this apparatus as can be seen in FIG. 9. A combination of Main TF, which reserves the channel and distribute per STA medium allocation and secondary TF, which is responsible for per STA triggering of UL transmissions to that STA can also be incorporated into this apparatus as can be seen in FIG. 9.

In these embodiments of the disclosure AP1 is using the Primary TF to allocate transmission time for P2P1 and P2P2, then each of those STAs allocates resources for the respective medium share in time and frequency (or Resource Units) to STAs that are transmitting to them using the Secondary TFs. Those Secondary IF are appended with NDP Extension (NE) which are p-matrix symbols transmitted from the individual Space Time Streams (STS) or antennas that are received and used for channel estimation, Power control estimation, frequency estimation (AFC) and timing estimation towards transmission of the UL PPDUs (marked HE TB MU OFDMA).

Figure 10A:
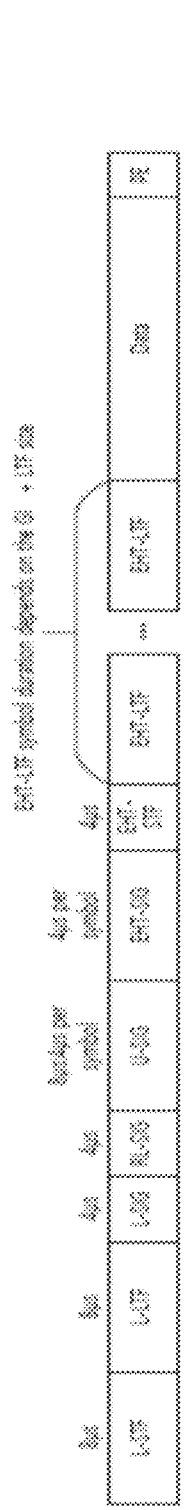
FIG. 10A illustrates an EHT MU PPDU format suitable for use with some embodiments.
Figure 10B:
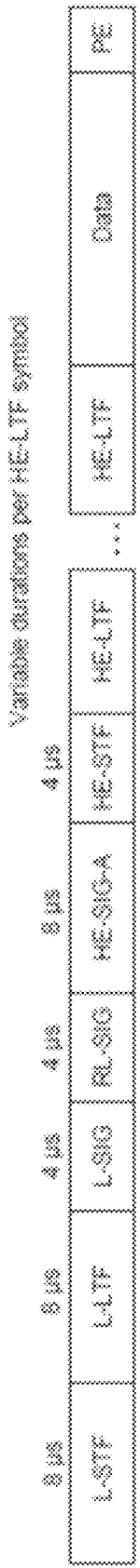
FIG. 10B illustrates an HE SU PPDU format suitable for use with some embodiments.

The NDP Extension (NE) are additional symbols used for sounding that are added to the PHY Protocol Data Unit (PPDU) used to carry the secondary TF, depending on the format used these additional LTF are either the HE LTF, the EHT LTF or other LTF set transmitted in a P-Matrix format of uncorrelated sequence modulated in the symbols and used for sounding. An exemplary of such EHT and HE frames are shown in FIGS. 10A and 10B. In these embodiments, the EHT and HE frames are shown in FIGS. 10A and 10B may be used for transmission of the secondary TF although the scope of the embodiments is not limited in this respect.

FIG. 11 illustrates a procedure for advanced TB P2P operation in accordance with some embodiments. Procedure 1100 is a procedure for trigger-based peer-to-peer (TB P2P) operation with at least two peer stations (P2P1) and (P2P2) in which the AP (AP1) is operating as a coordinator. In Operation 1102, a trigger frame (AP TF) is encoded for transmission. The AP TF may reserve channel resources for two or more P2P transfers. The AP TF may identify times for each of the P2P transfers and indicating an allocation of channel resources to a first of the peer stations (P2P1) for a first of the P2P transfers and to a second of the peer stations (P2P2) for a second of the P2P transfers.

Operations 1104-1108 may be performed during the allocation for the first P2P transfer. In operation 1104, a null data packet (NDP) frame for channel sounding received from the first peer station (P2P1) is decoded.

In operation 1106, a TB physical layer protocol data unit (PPDU) in accordance with a multi-user orthogonal frequency division multiple access (MU OFDMA) frame format is encoded for a transmission to the first peer station (P2P1) in accordance with an uplink multi-user multiple-input multiple output (UL MU MIMO) technique. The transmission may be based on channel state information determined from the NDP frame.

In operation 1108, the TB PPDU is transmitted concurrently with a corresponding TB PPDU from the second peer station (P2P2) in accordance with the UL MU MIMO technique based on a channel state information determined by the second peer station (P2P2) from the NDP frame. In these embodiments, illustrated in FIG. 8, two or more peer stations (i.e., P2P2, AP1 and AP2) may transmit a TB PPDU concurrently to the first peer station (P2P1) during the allocation for the first P2P transfer.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an Extremely High Throughput (EHT) station (EHT STA), the apparatus comprising: processing circuitry; and memory,
    wherein, when the EHT STA is operating as a first peer station for trigger-based peer-to-peer (P2P) operations with an EHT Access Point (EHT AP) and a second peer station, the processing circuitry is configured to:
    decode a trigger frame received from the EHT AP, the trigger frame reserving channel resources for two or more P2P transfers,
    the trigger frame indicating a time allocated to the first peer station for a first of the P2P transfers and a time allocated to the second peer station for a second of the P2P transfers, wherein the time allocated to the first peer station and the time allocated to the second peer station comprise time on a same channel;
    wherein during the time allocated for the first of the P2P transfers, the processing circuitry is configured to:
    encode a null data packet (NDP) frame for channel sounding for transmission;
    encode a first trigger-based (TB) physical layer protocol data unit (PPDU) for transmission to the AP in accordance with a EHT multi-user (MU) PPDU format; and
    encode a second TB PPDU for transmission to the second peer station in accordance with the EHT MU PPDU format,
    wherein the first and second TB PPDUs comprise concurrent OFDMA-based transmissions in accordance with an uplink (UL) MU multiple-input multiple output (MIMO) technique,
    wherein first channel state information reported by the EHT AP determined from the NDP frame is applied by the first peer station for transmission of the first TB PPDU to the EHT AP, and
    wherein second channel state information reported by the second peer station determined from the NDP frame is applied by the first peer station for transmission of the second TB PPDU to the second peer station.

2. The apparatus of claim 1, wherein during the time allocated for the second of the P2P transfers, the processing circuitry is configured to:
    decode a second NDP frame for channel sounding received from the second peer station; and
    decode a third TB PPDU received from the second peer station, the third TB PPDU configured in accordance with the EHT MU PPDU format.

3. The apparatus of claim 2, wherein a fourth TB PPDU is transmitted during the time allocated for the second of the P2P transfers from the second peer station to the EHT AP concurrently with the third TB PPDU.

4. The apparatus of claim 3, wherein the EHT STA is a non-AP STA, and
    wherein the third TB PPDU and the fourth TB PPDU comprise concurrent OFDMA-based transmissions in accordance with the UL MU MIMO technique.

5. The apparatus of claim 4, wherein during the time allocated for the first of the P2P transfers after transmission of the concurrent transmission of the first and second TB PPDUs, the processing circuitry is configured to encode scheduling feedback for transmission to the EHT AP, the scheduling feedback indicating whether the first peer station has additional data to send.

6. The apparatus of claim 5, wherein during the time allocated for the second of the P2P transfers after reception of the third TB PPDU,
    the second peer station is configured to transmit scheduling feedback to the AP indicating whether the second peer station has data to send.

7. The apparatus of claim 4, wherein the trigger frame further indicates a time allocated to a third peer station for a third of the P2P transfers,
    wherein during the time allocated for the third of the P2P transfers, the processing circuitry is configured to:
    decode a third NDP frame for channel sounding received from the third peer station; and
    decode a fifth TB PPDU received from the third peer station, the fifth TB PPDU configured in accordance with the EHT MU PPDU format.

8. The apparatus of claim 7, wherein a fifth TB PPDU is transmitted during the time allocated for the third of the P2P transfers from the third peer station to the EHT AP concurrently with the fifth TB PPDU.

9. The apparatus of claim 1, wherein the processing circuitry is configured to append an NDP extension (NE) to the NDP frame, the NE comprising additional symbols for channel sounding in a P-matrix format.

10. A non-transitory computer-readable storage medium that stores instructions for execution by processing circuitry of an Extremely High Throughput (EHT) station (EHT STA),
    wherein, when the EHT STA is operating as a first peer station for trigger-based peer-to-peer (P2P) operations with an EHT Access Point (EHT AP) and a second peer station, the processing circuitry is configured to:
    decode a trigger frame received from the EHT AP, the trigger frame reserving channel resources for two or more P2P transfers,
    the trigger frame indicating a time allocated to the first peer station for a first of the P2P transfers and a time allocated to the second peer station for a second of the P2P transfers, wherein the time allocated to the first peer station and the time allocated to the second peer station comprise time on a same channel;
    wherein during the time allocated for the first of the P2P transfers, the processing circuitry is configured to:
    encode a null data packet (NDP) frame for channel sounding for transmission;

encode a first trigger-based (TB) physical layer protocol data unit (PPDU) for transmission to the AP in accordance with a EHT multi-user (MU) PPDU format; and encode a second TB PPDU for transmission to the second peer station in accordance with the EHT MU PPDU format, wherein the first and second TB PPDUs comprise concurrent OFDMA-based transmissions in accordance with an uplink (UL) MU multiple-input multiple output (MIMO) technique, wherein first channel state information reported by the EHT AP determined from the NDP frame is applied by the first peer station for transmission of the first TB PPDU to the EHT AP, and wherein second channel state information reported by the second peer station determined from the NDP frame is applied by the first peer station for transmission of the second TB PPDU to the second peer station.

11. The non-transitory computer-readable storage medium of claim 10, wherein during the time allocated for the second of the P2P transfers, the processing circuitry is configured to:

decode a second NDP frame for channel sounding received from the second peer station; and decode a third TB PPDU received from the second peer station, the third TB PPDU configured in accordance with the EHT MU PPDU format.

12. The non-transitory computer-readable storage medium of claim 11, wherein a fourth TB PPDU is transmitted during the time allocated for the second of the P2P transfers from the second peer station to the EHT AP concurrently with the third TB PPDU.

13. The non-transitory computer-readable storage medium of claim 12, wherein the EHT STA is a non-AP STA, and wherein the third TB PPDU and the fourth TB PPDU comprise concurrent OFDMA-based transmissions in accordance with the UL MU MIMO technique.

14. The non-transitory computer-readable storage medium of claim 13, wherein during the time allocated for the first of the P2P transfers after transmission of the concurrent transmission of the first and second TB PPDUs, the processing circuitry is configured to encode scheduling feedback for transmission to the EHT AP, the scheduling feedback indicating whether the first peer station has additional data to send.

15. The non-transitory computer-readable storage medium of claim 14, wherein during the time allocated for the second of the P2P transfers after reception of the third TB PPDU, the second peer station is configured to transmit scheduling feedback to the AP indicating whether the second peer station has data to send.

* * * * *